United States Patent [19]

Flaten

[11] Patent Number: 4,657,446

[45] Date of Patent: Apr. 14, 1987

[54] BORING MACHINE FOR CAM SHAFT BEARINGS

[75] Inventor: James F. Flaten, Burnsville, Minn.

[73] Assignee: Sunnen Products Company, St. Louis, Mo.

[21] Appl. No.: 470,221

[22] Filed: Feb. 28, 1983

[51] Int. Cl.⁴ .................................. B23B 41/12
[52] U.S. Cl. ...................... 408/87; 248/670; 269/71; 408/234; 408/708; 409/227
[58] Field of Search ............ 269/71, 74, 78, 203, 269/289 R; 408/87, 88, 89, 708, 709, 234; 409/219, 224, 227; 82/36 R; 248/669, 671, 672, 670, 680, 681, 157, 163.2, 644, 186; 33/180 AT, 181 AT; 74/16

[56] References Cited

U.S. PATENT DOCUMENTS

| | | | |
|---|---|---|---|
| 1,096,808 | 5/1914 | Stockbridge | 409/227 X |
| 1,363,020 | 12/1920 | Shewalter | 269/78 X |
| 1,430,268 | 9/1922 | Sundstrand | 409/227 |
| 1,681,412 | 8/1928 | Knight | 409/227 |
| 1,698,862 | 1/1929 | Wadell | |
| 2,160,476 | 5/1939 | Kampmeier | 77/3 |
| 2,170,054 | 8/1939 | Jeschor | 77/3 |
| 2,213,408 | 9/1940 | Pogarch | 409/227 |
| 2,234,103 | 3/1941 | Antonelli | 82/36 R |
| 2,235,444 | 3/1941 | Wohlfarth et al. | 409/227 |
| 2,250,788 | 7/1941 | Arp | 77/2 |
| 2,413,574 | 12/1946 | Mitchell | 77/2 |
| 2,604,284 | 7/1952 | Arp | 248/23 |
| 3,306,601 | 2/1967 | Mitchell | 269/74 X |
| 4,132,494 | 1/1979 | Aldridge, Jr. | 408/54 |
| 4,168,826 | 9/1979 | Rottler | 269/73 |
| 4,213,721 | 7/1980 | Aldridge, Jr. | 408/54 |
| 4,302,882 | 12/1981 | Bradley et al. | 408/89 X |

Primary Examiner—Gil Weidenfeld
Assistant Examiner—Glenn L. Webb
Attorney, Agent, or Firm—Haverstock, Garrett & Roberts

[57] ABSTRACT

A boring machine used for a line boring bearing housings of an automotive engine block which provides for very secure mounting and precise operation by having rigidity built into the mounting table but yet is low cost, easy to fabricate, and readily adapted to a wide variety of different sizes of engine heads.

12 Claims, 6 Drawing Figures

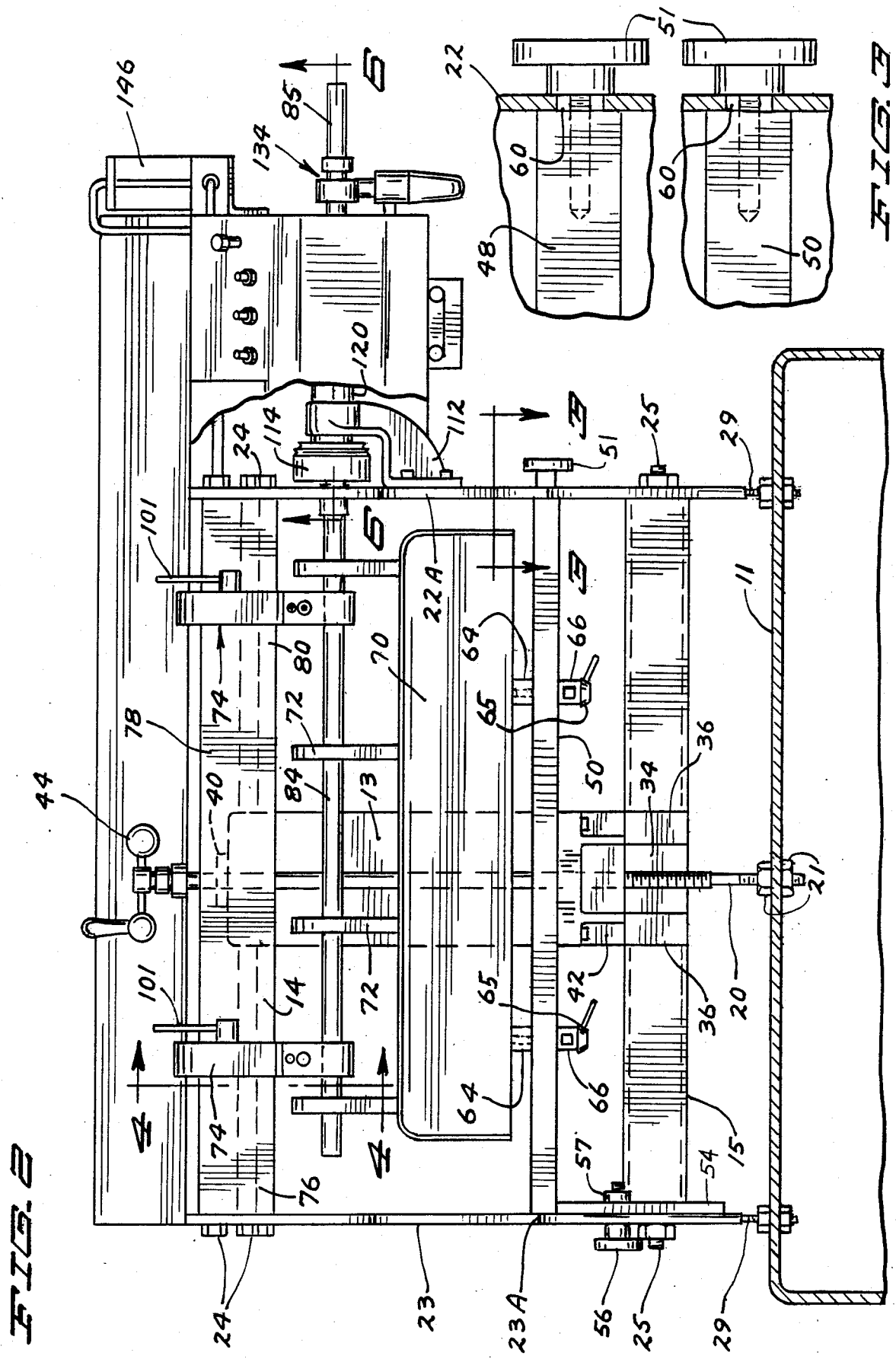

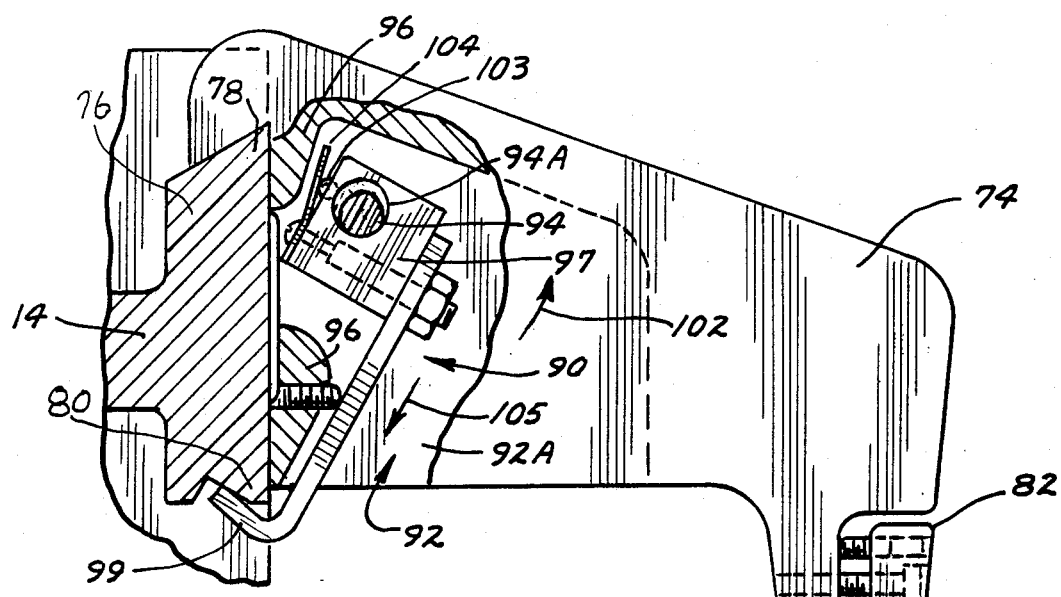
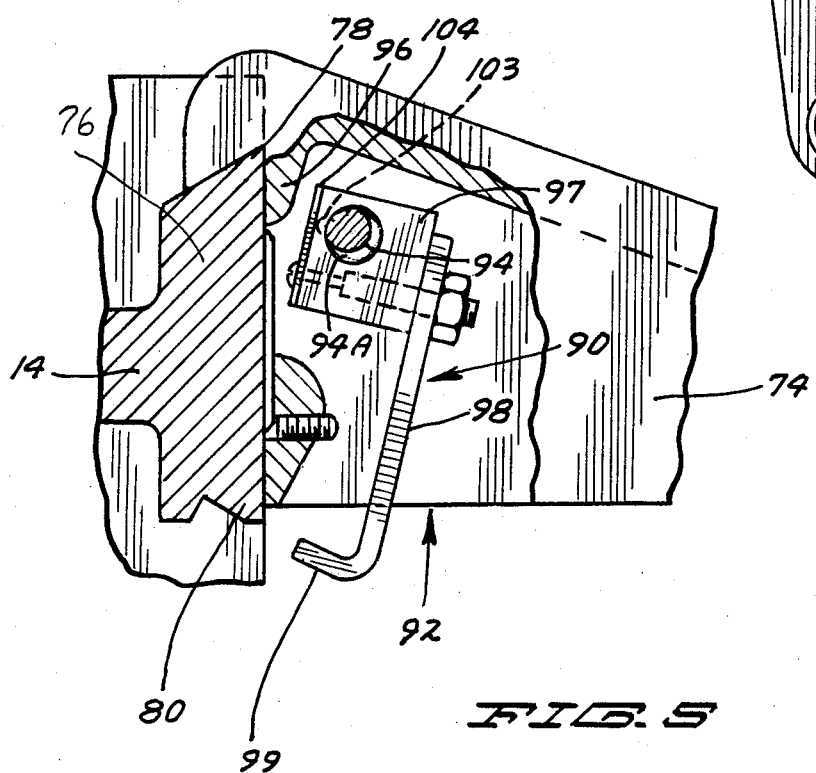

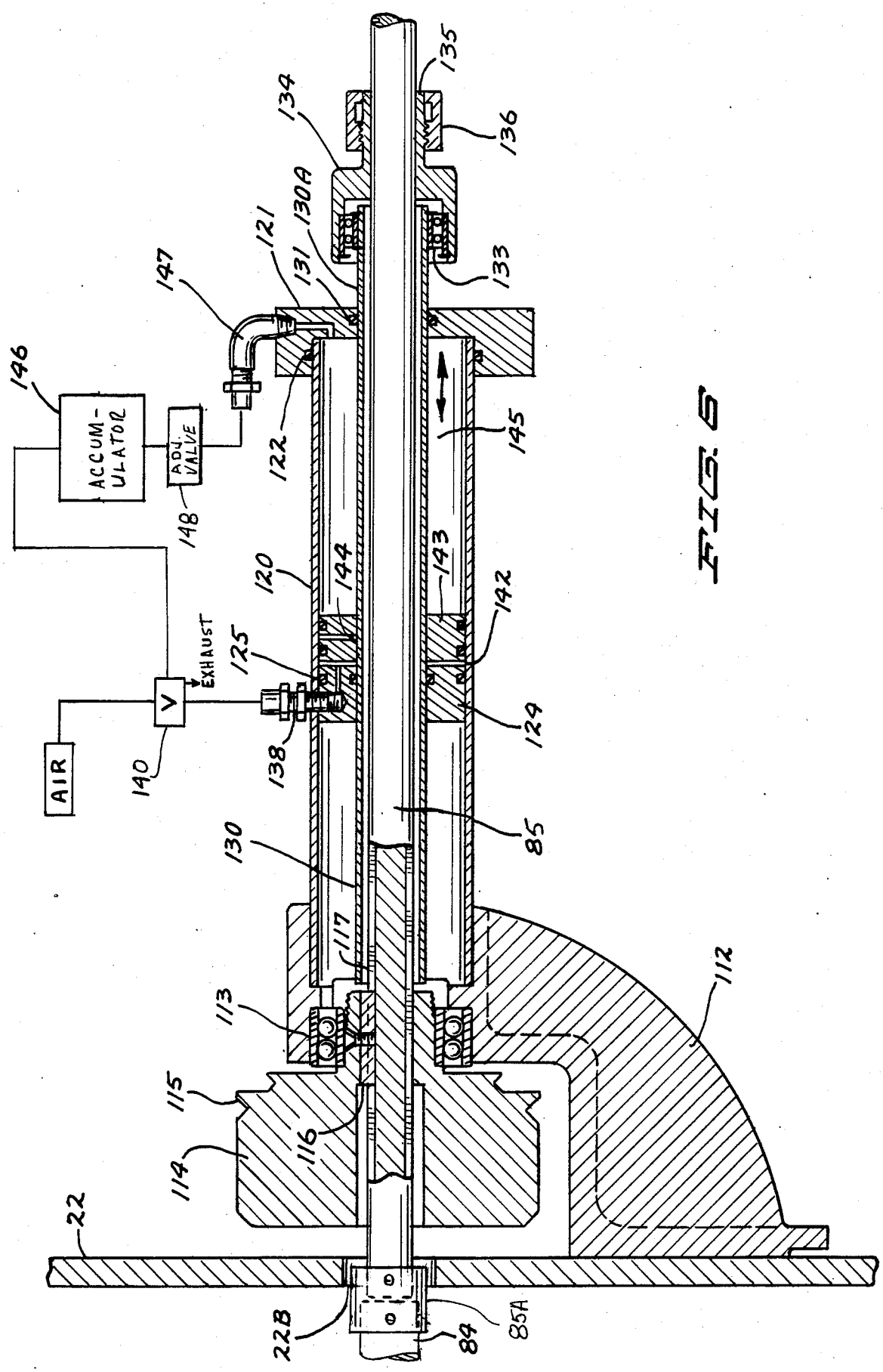

BORING MACHINE FOR CAM SHAFT BEARINGS

BACKGROUND OF THE INVENTION

1. Field of the Invention

The present invention relates to the field of line boring machines for bearing housings in engine heads for the bearings of cam shafts used in the engines.

2. Description of the Prior Art

Various machines have been developed for accurately line boring the housings for bearings that holds rotating shafts in engines, such as cam shafts or crank shafts. In the modern overhead cam engine, the bearings are held in supports or are integral in the engine head, and it is important to be able to properly position the head, hold it securely, do the boring, and then quickly set up for boring the next head. In the prior art, U.S. Pat. No. 2,250,788 issued to Ewald A. Arp on July 29, 1941 shows an early type machine for boring engine bearings. The machine does support an engine block in place on a table for the line boring. U.S. Pat. No. 2,604,284 also shows an adjustable base for a boring machine that is an improvement on U.S. Pat. No. 2,250,788. These machines are not easily adapted for use in boring bearing housings on engine heads, or the like.

U.S. Pat. No. 4,213,721 issued July 22, 1980 and U.S. Pat. No. 4,132,494 issued Jan. 2, 1979, both issued to Aldridge, show modern line boring machines for boring bearing housings in engine blocks using a type of machine that requires relatively elaborate set up, and rigid supports which in turn are quite expensive to make. The device is not easily adapted to boring engine heads.

U.S. Pat. No. 4,168,826 shows an engine block boring stand for boring crank shaft bearings as well as cam shaft bearings, but here too, it is the block being held as opposed to the head, the machine itself is not lightweight, yet rigid and easily made.

Additional patents which illustrate the state of the art include U.S. Pat. Nos. 1,698,862; 2,160,476; 2,170,054; and 2,413,574.

None of these structures show a machine which is the easily contructed, very rigid, and quite easily used with head members for boring the cam bearing bores for upper head cam shaft bearings.

SUMMARY OF THE INVENTION

This invention relates to a boring machine for boring the housings used for seating a cam shaft or cam shaft bearings particularly in overhead cam arrangements where the bearing housings are formed in supports on an engine head. The boring machine includes a low cost, easily made frame work that is very rigid and will securely hold an engine head in position during the boring operation. The frame will permit quick positioning with accurate adjustments.

The machine includes a vertical column having a pair of horizontal supports thereon as the main structural components. Side plates are mounted on the ends of the horizontal supports. A vertically adjustable table is movable along the vertical column between the side plates. The table has cross members, and after the table is positioned, the side plates are clamped to the ends of the table. When the side plates are secured to the table, a very rigid unit is made, even though the table is relatively low cost.

The boring bar supports are mounted on an upper cross member and are quickly adjusted, and also can be quickly changed if desired, as well as providing surfaces and means for mounting dial indicators. Further, a unique boring bar feed device is utilized in connection with the boring bar drive so that properly controlled infeed and outfeed can be obtained easily.

DETAILED DESCRIPTION OF THE PREFERRED EMBODIMENTS

FIG. 2 is a front view of the device in FIG. 1 with parts in section and parts broken away;

FIG. 3 is a view taken generally along line 3—3 in FIG. 2;

FIG. 4 is a sectional view taken on line 4—4 in FIG. 2;

FIG. 5 is a view showing the clamp member illustrated in FIG. 4 in a released position; and FIG. 6 is a sectional view taken on line 6—6 of FIG. 2.

DETAILED DESCRIPTION OF THE PREFERRED EMBODIMENTS

Figure 1:
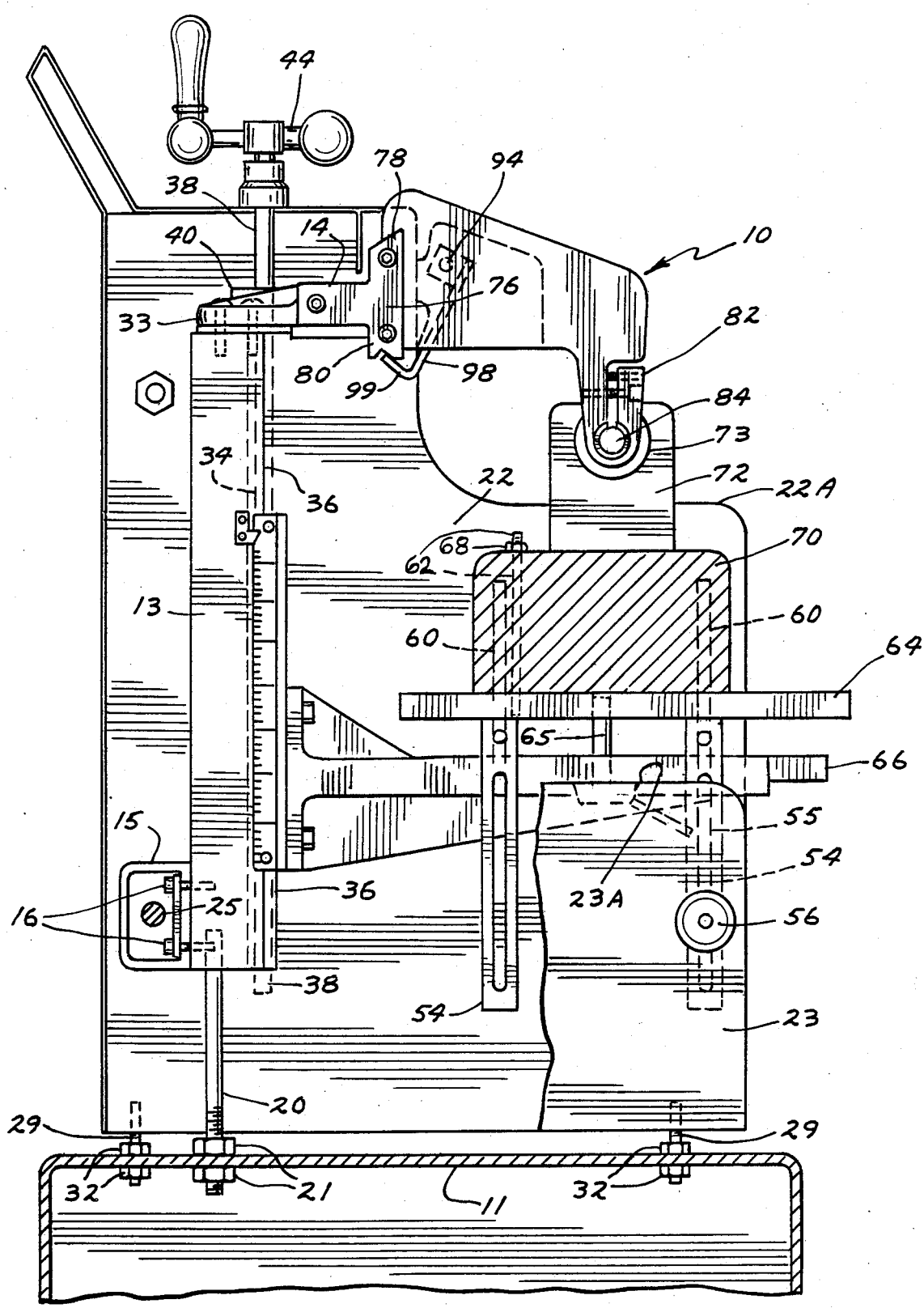
FIG. 1 is a side elevational view of a boring machine made according to the present invention with parts in section and parts broken away.

Referring to FIGS. 1 and 2, the boring machine indicated generally at 10 as shown is supported on a table top or plate 11 and includes as main structural members an upright vertical column 13, an upper cross member 14, and a lower cross member 15. The lower cross member 15 is a tubular member that is attached to the column 13 with suitable cap screws and fasteners indicated generally at 16.

The center column 13 is supported relative to the table or plate 11 with a stud or suitable support 20 that is adjustably mounted through the plate 11 with lock nuts 21, 21 and is threaded into the lower end of the column 13. Thus it can be seen that the column 13 ends above the plate 11 at a suitable height and is supported in place relative to the plate with the stud 20.

Additionally, the frame and support includes a first side plate or frame member 22, and a second side plate or frame member 23. A portion of plate 23 is shown in FIG. 1 and the rear portion is broken away. Both of the side plates 22 and 23 have rear portions that are full height, that is they extend from a position above the cross member 14 all the way to adjacent the table 11. The side plates 22 and 23 are fastened to the end surfaces of the cross member 14 with suitable cap screws 24, and thus secured tightly against the end surfaces of the cross member 14. Additionally, a through bolt 25 passes through the center of the cross member 15, which is tubular, and suitable nuts are used for attaching and tightening the through bolt 25 to clamp both of the side plates 22 and 23 against the ends of the cross member 15.

The bottom edges of the side plates 22 and 23 are supported on studs 29 which are threaded into the edges of plates 22 and 23 and are held onto the plate 11 with lock nuts 32, and are threaded into the bottom edges of the respective side plates to support the side plates slightly above the level of the table 11, and permit adjustment of the side plates to square the plates up and hold the unit rigidly in position.

The side plate 22, as shown, has a forward section indicated at 22A which has a height substantially greater than the formed portion of side plate 23. The side plate 23 is cut away to a lower level as shown by the line 23A in FIG. 2, and partially in FIG. 1 so that the end portion at the side plate 23 is open to a lower level than the side plate 22.

The cross member 14 is fastened to the upper end of the vertical column 13 with a suitable bracket member 33 that is tightly fastened to the upper end of the vertical column 13. The vertical column 13 has a recess 34 (see FIG. 2) in the center through which a vertical, rotatable adjustment screw 38 passes. The vertical adjustment screw indicated is threaded, and the member 33 has an opening through which this screw passes. The screw 38 has a thrust washer or member 40 thereon so that it reacts against the top of the member 33, and as the screw 38 is operated through rotation of its crank handle 44, it provides for vertical adjustment of a table support indicated generally at 42 through which the lower portions of the screw 38 is threaded. In other words the lower portions of the screw 38 mounts the table support 42, and as the screw 38 is rotated through the use of its crank handle 44 the table support 42 will move up and down along the center column 13. The table support 42 is guided with suitable dovetail guides 36 which, as shown in FIG. 2 are along the edges of the column 13 and flank the recess 34. Any suitable guideway may be used on the vertical column 13. The vertical member 13 is recessed to provide room for the screw 38. The support 42 in turn supports a pair of transverse rails or members 48 and 50 which form the support for an engine head that is to be repaired. The rails 48 and 50 at their first ends are threaded to receive screws 51 that pass through vertical slot openings 60 in side plate 22 and thread directly into the rails 48 and 50 (see FIG. 3). At the other end of the rails there are vertical slotted supports 54 bolted to the rails which extend vertically down from the rails 48 and 50. The slots in supports 54 are shown at 55 (FIG. 1), and the slots align with openings in the side plate 23 through which screws 56 having hand wheels thereon are mounted. The screws 56 are used to thread into clamping plates or nuts 57 on the interior of the supports 54, as shown in FIG. 2 to hold the supports 54 tightly against the side plate 23 when the table rails are in their correct vertical position. The screws 56 can be loosened to permit the table support 42 and rails 48 and 50 to be adjusted.

The screws 51 that are threaded directly into the cross members 48 and 50 of the table, such as screws 51, are mounted in slots 60 that are defined in the side plate 22, so that the cross rails 48 and 50 can be moved up and down after the screws 51 and 56 have been loosened, and then the screws 51 and 56 can be clamped tightly to hold the side plates rigidly against the rails and slotted supports to support the side plates securely in position.

The cut away defined by the line 23A along the side plate 23 permits clearance for parts that might protrude out beyond one end of the rails and table, as well as clearance for ease of placing engine heads onto the table.

The rails 48 and 50 are used to support parallel bars 64 on the top thereof, and these parallel bars then can be clamped into position by threading suitable screws 65 through bottom cross supports 66, and into bar 64. Suitable studs 62 and suitable nuts 68 (FIG. 1) are used to hold cylinder head 70 to the parallel bars 64 for boring.

The head 70 has cam shaft support members 72 thereon that extend upwardly when the head is in place on rails 48 and 50. The support members 72 have openings 73 which normally house cam shaft bearings.

Cross member 14 is used for supporting bearing bar support arms indicated generally at 74. These bearing bar supports 74 are movable along the cross member 14 and are supported on a dovetail support 76 that forms the forward edge of the cross member 14. The dovetail support has one dovetail member 78 at the upper end, and a hook receiving dove-tail member shown at 80 at the lower edge. As shown in detail in FIGS. 4 and 5, the boring bar supports 74 have depending end members 82 which house bushings shown generally at 83 that in turn rotatably support a boring bar 84. The boring bar 84 is, as will be explained, rotatable about its longitudinal axis, and also is movable longitudinally so that the tools carried by the boring bar for boring out the openings 73 can be used properly.

The boring bar arms or supports 74 are also capable of being moved longitudinally along the cross member 14 (that is side to side relative to the side plates 22 and 23) and then clamped in position to securely hold the boring bar 84 properly.

In order to provide for relatively quick adjustment for the boring bar supports 74, a releasable hook indicated generally at 90 is provided. The boring bar supports 74 have a recess or receptacle indicated generally at 92 in the central portions in which the hook assembly 90 is mounted. The receptacle or recess 92 is defined by spaced side plates 92A. A cam shaft 94 is mounted on the boring bar supports between the side plates 92A forming the recess 92. The side plates 92A are supported with a cross member as shown in section at 96 to provide locating surfaces and for adequate support near the cross member 14. The hook assembly 90 includes a cam block 97 that is mounted on the cam lobe 94A of the cam shaft 94, and the cam block 97 in turn mounts a hook 98 that has a hook end 99 that goes under the lower dovetail lip 80 on the cross member 14. When the cam shaft 94 is operated by moving the external cam lever 101 (see FIG. 2), the cam block 97 and hook will tend to be moved with the cam shaft 94 due to the use of a spring loaded ball indicated at 103 mounted in the block 97, which bears against the cam lobe portion 94A of the cam shaft 94 that mounts in the block 97. This ball 103 is spring loaded with a leaf spring 104 to create a drag that causes the hook member 98 to move with the shaft under a controlled force. When the cam shaft 94 is in position as shown in FIG. 4 it has been rotated clockwise and has pulled the hook end 99 tight against the lip 80 to lock the support 74 tightly in position. Note that the outer surfaces of cross members 96 rest on the front face of dovetail support 76 and thus are positively and properly positioned relative to the support 76. To release the support the cam shaft 94 is rotated in counterclockwise direction as indicated by arrow 102. The cam portion of shaft 94 lowers the block 97 so that hook portion 99 moves down away from dovetail member 80. The drag on shaft 94 from the spring loaded ball 103 carried by block 97 urges the block to rotate with the shaft and this drag will be sufficient to move the hook away from the dovetail member 80 to position generally as shown in FIG. 5 for removal or adjustment of the support 74.

Reverse movement will cause the cam to rotate the hook 98 and to pull up and tighten the hook portion 99 against the dovetail member 80 and then cause the mating dovetail portion at the top of the cross member 14 to engage tightly again.

When the cam is to be released, again, as described, the cam shaft rotation and the cam action will cause the hook portion 99 to move down as indicated by the arrow 105 and release from underneath the dovetail member 80, and then be dragged to its position in counterclockwise direction as shown in FIG. 5.

The boring bar supports 74 can be moved so that they can be positioned between the upright supports on the head and properly support the boring bar 84 in position for boring.

The driving of the boring bar 84, and its longitudinal movement for boring out the cam shaft bearing openings 73 in the supports 72 comprises a unique air over hydraulic cylinder for longitudinal control of a drive bar 85 which is drivably coupled with a coupling 85A to the boring bar, and also for rotational drive as shown in detail in FIG. 6. As can be seen, the side frame plate 22 has an opening 22B for the drive bar 85, and the boring bar 84 is drivably connected to the drive bar 85 adjacent this side frame plate. The boring bar rotates with and also moves longitudinally with the drive bar 85. A support 112 is attached in a suitable way to the exterior of side plate 22, and mounts a bearing 113 that in turn rotatably mounts a drive pulley 114 that is driven from a suitable V belt groove 115 from a drive belt in a normal manner. The drive bar 85 passes through an interior opening in this drive pulley 114. The drive pulley 114 as shown includes a square key 116 held in position with a screw and which engages a keyway 117 in the drive bar. This is a longitudinally extending keyway 117 in the drive bar that receives the key 116 to be rotatably driven by the pulley 114 when the pulley is driven by a belt through its V belt groove 115.

The support 112 also houses and supports a tube 120 that extends laterally outwardly. The tube 120 forms a fluid pressure actuator, and has an end cap 121 at the outer end thereof that is sealed with a suitable seal 122 to the outer end of the tube 120. The tube 120 in turn has a fixed internal block 124 mounted in the center portions thereof that is sealed with a suitable seal 125 relative to the inner surface of the tube. Block 124 houses a second tube 130 that is concentric with tube 120 and which extends out through and is supported in the end cap 121. The tube 130 is also sealed with respect to end cap 121 with a seal 131. This inner tube 130 surrounds and is spaced from the drive bar 85. The tube 130 has an outwardly extending end portion 130A, that has a bearing 133 mounted thereon. The bearing 133 in turn rotatably mounts a chuck member 134. The chuck member 134 has a housing that is mounted on the bearing 133, and a clamping chuck assembly 135 having a tightening nut 136. The drive bar 85 as shown extends out beyond this chuck member, and when the nut 136 is tightened down, the drive bar 85 is clamped so that it moves with the clamping chuck assembly 135.

It can be seen that the driving connection for rotation of drive bar 85 is not at the chuck 135, but that longitudinal movement of the drive bar 85 can be controlled by clamping of the chuck 135 by tightening the nut 136.

Again, the housing of chuck member 134 rotates on the bearing 133, so that the tube 130 does not rotate as the drive bar 85 rotates.

Rotation of the pulley 114 will cause rotation of the drive bar 85, and this in turn will cause the housing of chuck member 134 to rotate on bearing 133 relative to the tube 130, but the tube 130 is mounted in the piston 143 and is held from rotation.

A fitting 138 is provided for permitting air to be introduced into the block 124 and through suitable passageways into a space 142 between the block 124 and a piston 143 that it attached to the tube 130. The piston 143 is sealed with respect to the interior of the tube 120, and is slidable along the length of the tube 120 when there is air pressure in the chamber 142. The larger chamber shown at 145 in FIG. 6 and inside the tube 120 between the piston 143 and end cap 121 is filled with hydraulic oil, a noncompressible fluid. A conduit connection is made from this chamber 145 to a hydraulic accumulator 146. The connections to the hydraulic accumulator 146 includes a feed control valve 148 for controlling oil flow to and bleeding oil back from one side of the accumulator, and a connection 147 for hydraulic fluid that opens through suitable passageways in the end cap 121 to the interior of the tube 120 and thus to chamber 145.

During the boring operation, the pulley 114 is powered to rotate the drive bar 85, and of course the support chuck 134 which grips the drive bar. Note that the bearing 133 is held from longitudinal movement along the tube 130 through the use of snap rings that hold the bearing in place.

During rotation of the drive bar 85, the drive bar 85 may be moved longitudinally by operating a valve 140 that introduce air through the fitting 138 to apply air pressure in chamber 142 and to release air pressure from accumulator 145. The oil in chamber 145 then will flow out through the fitting 147 through an adjustable feed control valve 148 and into the accumulator 146. The piston 143, tube 130, chuck 134 and drive bar 85 will be moved longitudinally to the right. When the air pressure is removed from chamber 142 and applied to accumulator 146, with valve 140, the oil forced out of the accumulator 146 will cause the piston 143 to be moved back toward the left in FIG. 6 under the hydraulic pressure from the accumulator 146, through a one-way check valve in feed control valve 148. The rate of movement of the drive bar 85 and thus the boring bar 84 can be controlled by using the feed control valve 148 for control of the rate of flow of hydraulic oil out of the cylinder chamber 145. Valve 148 may be any suitable variable orifice valve that permits full flow to move the piston 143 to the left in FIG. 6.

Although the present invention has been described with reference to preferred embodiments, workers skilled in the art will recognize that changes may be made in form and detail without departing from the spirit and scope of the invention.

What is claimed is:

1. A boring machine for line boring a plurality of bearing housings in a work piece such as a portion of an internal combustion engine comprising:

a machine frame having front, rear, and spaced sides;
 a generally upright support column located adjacent to and extending upwardly along the rear of the machine frame at an intermediate location;
 a cross member mounted adjacent to the upper end of said support column and extending across the machine frame;
 a pair of spaced generally upright end plates attached respectively to opposite ends of the cross member and defining therewith a work space in front of the support column;
 means attachable to the cross member including means for engaging and supporting a generally horizontally extending boring bar between said end plates;
 a table structure for supporting a work piece having surfaces thereon to be bored by the boring bar including a generally horizontal table portion extending between the spaced end plates;

means on the cross member adjacent to the support column threadedly engageable with the table structure and rotatable by crank means adjacent to the upper end thereof relative to the cross member to adjust the vertical position of the table portion, said table portion having a first end positioned adjacent to one of said spaced end plates, and a second opposite end positioned adjacent to the other of said spaced end plates; and means carried on the table portion adjacent one end thereof for releasably clamping the first end of the table portion to one of said spaced end plates and other means carried on the table portion adjacent the opposite end thereof for releasably clamping the second opposite end of the table portion to the other of said spaced end plates whereby when both ends of the table portion are clamped the table portion is rigidly maintained between the end plates and with respect to the upright support column and the boring bar.

2. The boring machine of claim 1 wherein said table portion comprises a plurality of spaced rail members having respective opposite ends terminating on common planes, said means for releasably clamping the respective first and second ends of the table portion include a member threadably mounted in each opposite end of each of said rail members, each of said spaced end plates having vertical slots formed therein to receive the respective threaded member, the threaded members attached to the respective rail members being tightened to securely fasten the rail members of the table portion to the spaced end plates.

3. The boring machine of claim 2 wherein one of the spaced end plates has an upper portion that extends upwardly less far than the corresponding portion of other of said spaced end plates to form an open space at the respective end of the machine, and means including connection members extendable between the rail members and said one end plate to enable attachment of the rail members thereto whereby the rail members can be rigidly supported between the spaced end plates even when one end of the rail members is adjacent to the open space.

4. The boring machine of claim 1 wherein said table portion comprises two longitudinally extending support rails having ends adapted to be connected to the respective end plates.

5. The boring machine of claim 1 wherein said means to support the boring bar comprises a dovetail-shaped cross sectional portion formed along the cross member defined by spaced side edges, at least one support member having a first end portion adapted to cooperate with the spaced side edges of the dovetail-shaped cross sectional portion of the cross member and an opposite end portions adapted to receive the boring bar therethrough, the first end portion of the support member including a hook member pivotally mounted on the support member and movable thereon between a first position clamping the first end of the support member to the dovetail-shaped portion of the cross member and a second position angularly related thereto whereby the support member can be detached from the dovetail portion.

6. The boring machine of claim 5 wherein said support member includes cam means operable for moving said hook member between the first and second positions thereof.

7. The boring machine of claim 6 wherein said cam means includes a cam shaft rotatably mounted on the support member and operatively connected to the hook member, and means to move the cam shaft whereby the hook member moves between said first and second positions.

8. An overhead line boring machine for line boring a plurality of bearing housings in a workpiece, comprising:

a frame having a forward side for operator access and a rear side and including:

first and second generally upright laterally spaced side frame plates defining a work area therebetween, one of said side frame plates having a cut-out portion defining an open space on one side of the frame of the machine, each of the side frame plates having a substantially flat surface facing toward the work area;

a cross member extending between and connecting the side frame plates adjacent to the rear side of the machine and adjacent to the upper ends of the side frame plates, means attachable to the cross member and extending therefrom for rotatably supporting a boring bar extending between the side frame plates;

an upright support column extending adjacent to the rear side of the frame at an intermediate location therealong and connected to the cross member;

a table structure for supporting a workpiece to be bored, said table structure including a generally horizontal table portion mounted in the work area and extending between the side frame plates;

adjustment means associated with the upright column including a member threadedly engageable with the table portion and means including crank means adjacent to the upper end thereof for rotating the threaded member for adjusting the vertical position of the table portion; and locking means carried on the table portion and associated respectively with each of said side frame plates, each of said locking means being movable between a first position locking the table portion to the respective side frame plate and another position freeing the table portion from the associated side frame plate to enable the table portion to be moved vertically relative to the side frame plates under control of the adjustment means.

9. The boring machine of claim 8 wherein said table structure and said upright column include cooperatively engageable guide means enabling the table portion to move vertically while slideably engaged with the upright column.

10. The boring machine of claim 9 wherein said the cooperatively engageable guide means include cooperatively engageable dovetail guide means a portion of which is on the upright column and a portion of which is on the table portion.

11. The boring machine of claim 8 including a second cross member connected to the upright column and extending between the side frame plates adjacent to the lower ends thereof adjacent to the rear of the frame, and means to connect the side frame plates to respective ends of the second cross member to support the side frame plates in spaced apart relationship.

12. The boring machine of claim 8 wherein the locking means associated with each of the side frame plates includes a threaded locking member having a first portion threaded into the respective end of the table portion, an elongated vertical slot through each respective end frame plate for receiving the first threaded portions therethrough, and a second portion movable into engagement with the respective side frame plate when the respective first threaded portion is threaded into the table portion.

* * * * *